United States Patent
Isenmann et al.

(10) Patent No.: US 12,407,690 B2
(45) Date of Patent: Sep. 2, 2025

(54) APPARATUS FOR PROTECTING ACCESS TO SEGMENTS IN DISTRIBUTED SYSTEMS

(71) Applicant: VEGA Grieshaber KG, Wolfach (DE)

(72) Inventors: Andreas Isenmann, Haslach im Kinzigtal (DE); Clemens Hengstler, Haslach (DE); Florian Burgert, Gengenbach (DE)

(73) Assignee: VEGA Grieshaber KG, Wolfach (DE)

( * ) Notice: Subject to any disclaimer, the term of this patent is extended or adjusted under 35 U.S.C. 154(b) by 288 days.

(21) Appl. No.: 17/525,198

(22) Filed: Nov. 12, 2021

(65) Prior Publication Data
US 2022/0159009 A1 May 19, 2022

(30) Foreign Application Priority Data
Nov. 13, 2020 (EP) .................................. 20 207 449

(51) Int. Cl.
*H04L 9/40* (2022.01)

(52) U.S. Cl.
CPC .......... *H04L 63/104* (2013.01); *H04L 63/101* (2013.01); *H04L 63/20* (2013.01)

(58) Field of Classification Search
CPC ..... H04L 63/20; H04L 63/104; H04L 63/101; H04L 63/108; H04L 63/02; H04L 67/12; G06F 21/40; G06F 2221/2137; G06F 21/62; G06F 21/44; G06F 21/604; G05B 2219/31255; G05B 2219/36542; G05B 19/4185
See application file for complete search history.

(56) References Cited

U.S. PATENT DOCUMENTS

| | | | |
|---|---|---|---|
| 11,835,931 B2 * | 12/2023 | Iwanami | B65F 1/00 |
| 2009/0060192 A1 | 3/2009 | Budampati et al. | |
| 2014/0273847 A1 | 9/2014 | Nixon et al. | |
| 2014/0274123 A1 | 9/2014 | Nixon et al. | |
| 2014/0277593 A1 | 9/2014 | Nixon et al. | |
| 2014/0277594 A1 | 9/2014 | Nixon et al. | |
| 2014/0277595 A1 | 9/2014 | Nixon et al. | |
| 2014/0277596 A1 | 9/2014 | Nixon et al. | |
| 2014/0277605 A1 | 9/2014 | Nixon et al. | |

(Continued)

FOREIGN PATENT DOCUMENTS

DE 10 2014 105 076 A1 10/2015

OTHER PUBLICATIONS

European Office Action issued Sep. 12, 2023 in European Patent Application No. 20207449.8, citing references 1 and 2 therein, 8 pages.

(Continued)

*Primary Examiner* — Sangseok Park
(74) *Attorney, Agent, or Firm* — Oblon, McClelland, Maier & Neustadt, L.L.P.

(57) ABSTRACT

An apparatus for protecting access to a segment in distributed systems is provided, the apparatus including: an input device configured to acquire access data for a first field device; and a verification device configured to verify the acquired access data from a second field device, the first field device and the second field device being coupled to the segment. A computer network segment comprising at least two apparatuses, a method of protecting access to a segment in distributed systems, and a nontransitory computer-readable storage medium are also provided.

13 Claims, 3 Drawing Sheets

(56) References Cited

U.S. PATENT DOCUMENTS

| | | |
|---|---|---|
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0280497 A1 | 9/2014 | Nixon et al. |
| 2014/0282015 A1 | 9/2014 | Nixon et al. |
| 2014/0282257 A1 | 9/2014 | Nixon et al. |
| 2016/0063785 A1* | 3/2016 | Benkert .................. G07C 9/20 340/5.23 |
| 2016/0119284 A1 | 4/2016 | Kim |
| 2017/0041796 A1 | 2/2017 | Spiegel et al. |
| 2017/0070883 A1 | 3/2017 | Kim |
| 2019/0349426 A1* | 11/2019 | Smith .................. H04L 67/562 |
| 2020/0228981 A1 | 7/2020 | Chen |
| 2020/0326801 A1 | 10/2020 | Nixon et al. |
| 2021/0249145 A1* | 8/2021 | Futamura .............. H04L 9/3273 |

OTHER PUBLICATIONS

Extended European Search Report issued May 3, 2021 in European Patent Application No. 20207449.8, 10 pages.

* cited by examiner

APPARATUS FOR PROTECTING ACCESS TO SEGMENTS IN DISTRIBUTED SYSTEMS

CROSS-REFERENCE TO RELATED APPLICATIONS

This application claims the benefit of the filing date of European Patent Application No. 20 207 449.8, filed on 13 Nov. 2020, the entire content of which is incorporated herein by reference.

FIELD

The invention relates to an apparatus for protecting access to segments in distributed systems. Further, the present invention relates to a method for protecting access for a segment in distributed systems, and a corresponding program element and computer-readable storage medium.

BACKGROUND

A central user administration in distributed systems can be done, for example, with the so-called Lightweight Directory Access Protocol, a protocol standard for querying and modifying information of a directory service, also known as Active Directory.

According to the current state of the art, each field device is equipped with an individual access code and an individual code for locking the parameterization.

If a large number of sensors are used in a process plant, the valid access code must be entered for each individual sensor, which ensures a high level of security but represents a certain hurdle in the application.

SUMMARY

It is an object of the present invention to provide an improved apparatus for protecting access for segments in distributed systems.

The present invention enables to provide a verification of the access data by all field devices grouped in a segment.

This task is solved by the features of the independent patent claims. Further embodiments of the invention result from the sub claims and the following description of embodiments.

A first aspect of the invention relates to an apparatus for protecting access for a segment in distributed systems, the apparatus comprising: an input device adapted to detect access data for a first field device.

Further, the apparatus according to the invention comprises verification means adapted to verify the acquired access data from a second field device, wherein the first field device and the second field device are coupled to the segment.

Advantageously, the present invention allows connection to a segment having a plurality of field devices to any field device in that segment even if the access code to a field device of the segment is known.

For this purpose, the required access data of all field devices coupled to a segment are checked for correctness when establishing a connection to a field device. If a field device from the segment confirms that the access data is correct, access to the desired field device is enabled.

Advantageously, the present invention enables a secure yet simple access to a field device to be provided.

According to one embodiment of the invention, it is provided that the verification device is adapted to provide access to the first field device and/or the second field device using the access data.

According to one embodiment of the invention, it is provided that the verification device is adapted to temporarily enable access using the access data.

According to one embodiment of the invention, it is provided that the verification device is configured to use the access data to temporarily enable access for a predetermined period of time and/or for a predetermined process sequence. The process sequence may comprise a sequence of program steps for providing access to a field device.

According to one embodiment of the invention, it is provided that the verification device is adapted to verify the acquired access data for access to the first field device of the segment by all field devices of the segment.

According to one embodiment of the invention, it is provided that the device is a security server.

Another aspect of the invention relates to a method for protecting an access for a segment in distributed systems.

As a first step of the method for protecting an access for a segment in distributed systems, an acquisition of access data for a first field device is performed.

As a second step of the method of protecting access for a segment in distributed systems, verifying the captured credentials from a second field device, wherein the first field device and the second field device are coupled to the segment.

At this point, it should be noted that according to a further aspect of the invention, the features described above and below with respect to the field device or the apparatus may also be implemented as process steps.

Similarly, the method steps described above and below may be performed by certain embodiments of the field device or apparatus.

According to a further aspect of the invention, there is disclosed a program element which, when executed on a processor of the field device or apparatus, instructs the field device or apparatus comprising the apparatus of the invention to protect access for a segment to perform the steps described above and below.

According to another embodiment of the invention, there is disclosed a computer-readable medium on which a program element described above is stored.

The program element may be part of software stored on a processor. Furthermore, this embodiment of the invention comprises a program element which is subject to the method or individual method steps described above and below.

According to another embodiment of the invention, the distributed system comprising the device according to the invention for protecting an access for a segment may be realized as a distributed computing environment.

According to another embodiment of the invention, the distributed system may comprise the device according to the invention for protecting an access for a segment as a networked client-server system with a smartphone as a client having access to field devices or level meters and to storage or processing resources in a computer cloud.

The term "computer cloud" refers to an IT infrastructure that is made available via the Internet, for example.

According to a further embodiment of the invention, the distributed system comprising the device according to the invention for protecting an access for a segment may be formed as a networked heterogeneous or homogeneous computer network comprising at least two devices according to the first aspect and/or a plurality of field devices or level measurement devices interacting via the computer network or, for example, also as an ad hoc network or networked via the Internet.

According to another embodiment of the invention, the computer network comprising the device of the invention for protecting access may be divided into computer network segments.

Further embodiments of the invention are described below with reference to the figures. Where the same reference signs are used in the following description of figures, these designate the same or similar elements. The representations in the figures are schematic and not to scale.

DETAILED DESCRIPTION OF EMBODIMENTS

The illustrations in the figures are schematic and not to scale.

If the same reference signs are used in different figures in the following figure description, these designate the same or similar elements. However, the same or similar elements can also be designated by different reference signs.

Figure 1:
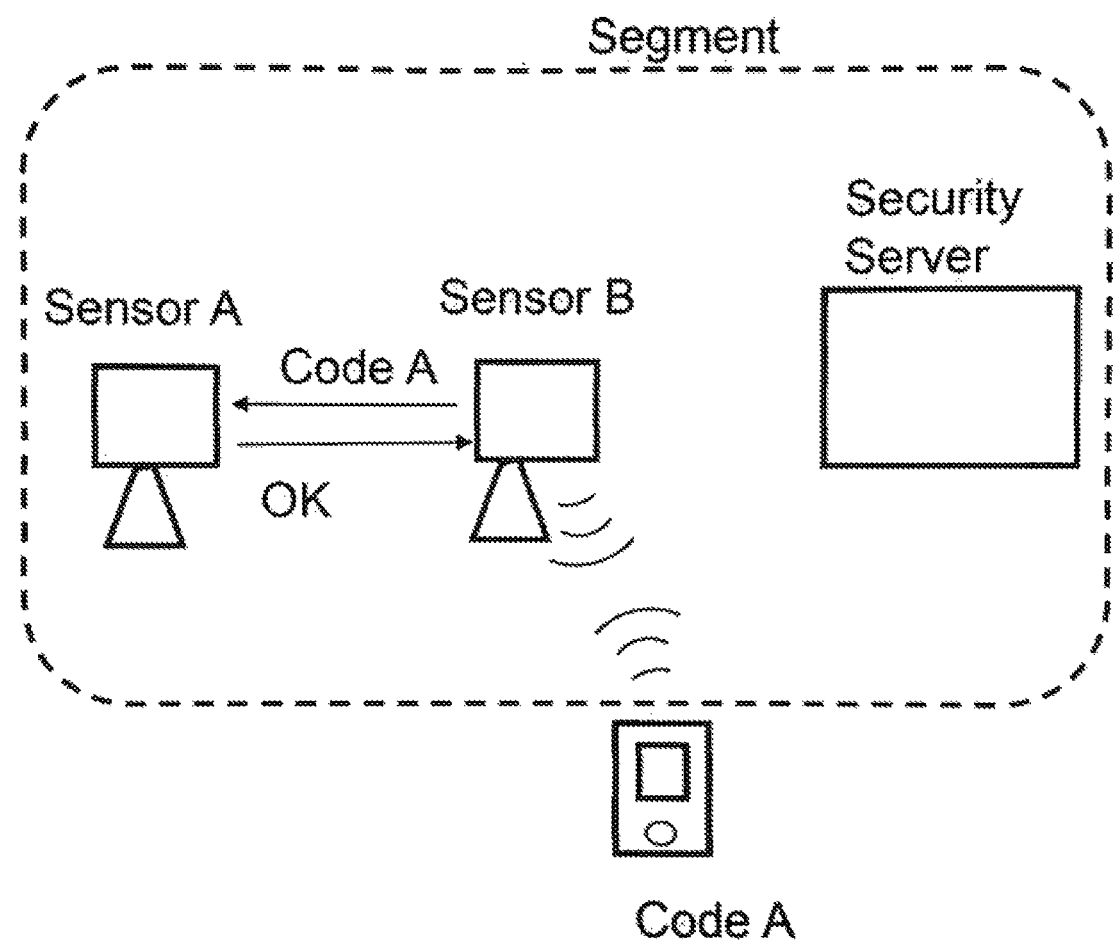
FIG. 1 shows an apparatus for protecting access for a segment in distributed systems according to one embodiment of the invention.

FIG. 1 shows an apparatus for protecting access for a segment in distributed systems according to one embodiment of the invention.

According to one embodiment of the invention, it is provided that a verification of the access data for access to a field device of a segment is performed by all or at least by a predetermined proportion of the field devices of the segment, such as more than half or one third.

According to one embodiment of the invention, if the access data matches the access data stored in a field device, access is enabled.

According to one embodiment of the invention, it is provided that, in case of integration of a security server into the segment of the field devices, this security server can centrally provide access to the sensors in the segment.

According to one embodiment of the invention, it is provided that a temporary release is made, e.g., for a service technician for all field devices of the segment in which a time-limited access code is set up on one of the field devices or on the security server.

According to one embodiment of the invention, it is provided that each field device may be included in a plurality of segments. In this way, it is possible to control which access data may act on which field devices.

For a field device A, for example, the access data from a field device of segment A must then be known, whereas for a field device B the access data of segment A and segment B can be used if field device A is only part of segment A, whereas field device B is part of segments A and B.

According to one embodiment of the invention, the field devices are designed as field devices for process automation, in particular for determining a process variable such as level or pressure.

Figure 2:
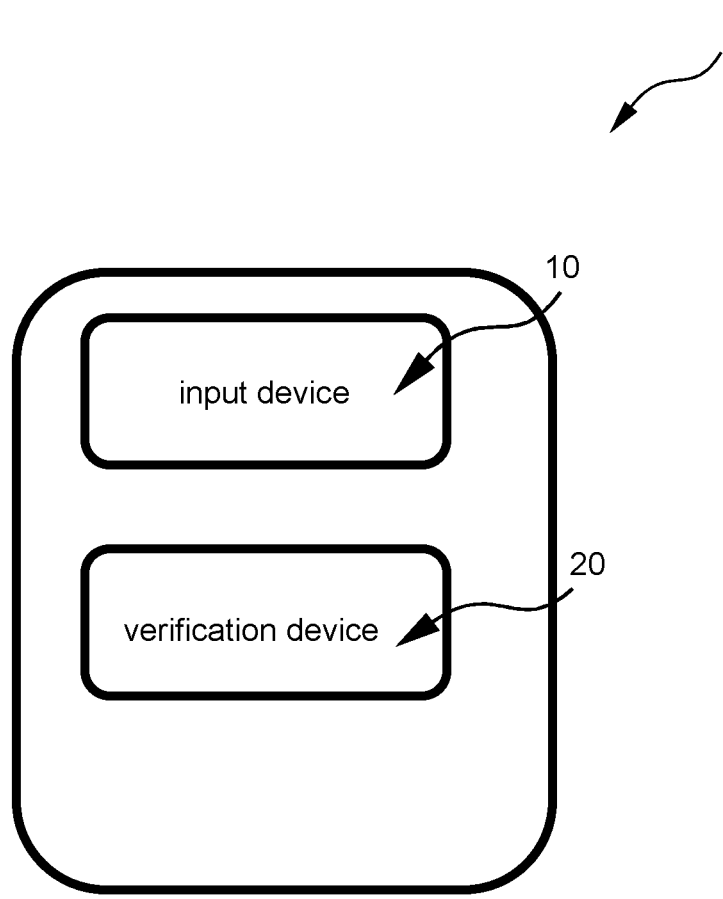
FIG. 2 illustrates an apparatus for protecting access for a segment in distributed systems according to one embodiment of the invention.

FIG. 2 illustrates an apparatus for protecting access for a segment in distributed systems according to one embodiment of the invention.

The apparatus 1 for protecting access for a segment in distributed systems includes an input device 10 and a verification device 20.

The input device 10 is configured to acquire access data for a first field device.

The verification device 20 is adapted to verify the captured credentials from a second field device, wherein the first field device and the second field device are coupled to the segment.

Figure 3:
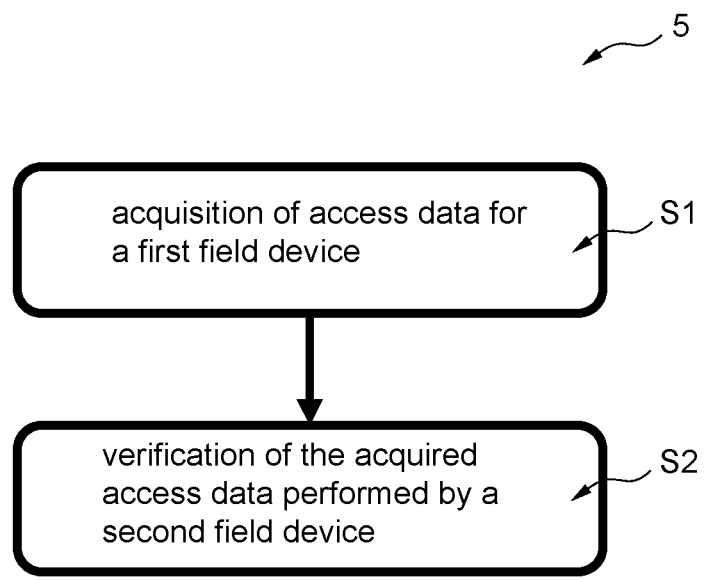
FIG. 3 shows a flowchart of a method for protecting access for a segment in distributed systems according to one embodiment of the invention.

FIG. 3 shows a flowchart of a method 5 for protecting access for a segment in distributed systems according to one embodiment of the invention.

As a first step of the method for protecting an access for a segment in distributed systems, an acquisition S1 of access data for a first field device is performed.

As a second step of the method for protecting access for a segment in distributed systems, a verification S2 of the acquired access data is performed by a second field device, wherein the first field device and the second field device are coupled to the segment.

According to one embodiment of the invention, it is provided, that the access data is used to provide access to the first field device and/or the second field device.

According to one embodiment of the invention, it is provided, that access is temporarily enabled with the access data.

It should also be noted that "comprising" and "comprising" do not exclude other elements or steps, and the indefinite articles "one" or "a" do not exclude a plurality.

It should further be noted that features or steps that have been described with reference to any of the above embodiments may also be used in combination with other features or steps of other embodiments described above. Reference signs in the claims are not to be regarded as limitations.

The invention claimed is:

1. An apparatus for protecting access to a segment as a networked client-server system in distributed systems with a smartphone as a client,
    the segment comprising at least two field devices as servers interacting via a computer network or via an ad hoc network, each field device as server being equipped with access data, the access data comprising an individual access code and an individual code for locking a parameterization of the field device, and
    the apparatus comprising:
        an input device configured to acquire the access data for a first field device, and
        a verification device configured to verify the acquired access data from a second field device,
        wherein the first field device and the second field device are coupled to the segment.

2. The apparatus according to claim 1, wherein the verification device is further configured to enable access to the first field device and/or the second field device with the access data.

3. The apparatus according to claim 2, wherein the verification device is further configured to temporarily enable access with the access data.

4. The apparatus according to claim 3, wherein the verification device is further configured to use the access data to temporarily enable access for a predetermined period of time and/or for a predetermined process sequence.

5. The apparatus according to claim 1, wherein the verification device is further configured to verify the acquired access data for access to the first field device of the segment by all field devices of the segment.

6. The apparatus according to claim 1, wherein the apparatus is configured as a security server.

7. A field device comprising an apparatus according to claim 1.

8. A computer network segment comprising at least two apparatuses according to claim 1.

9. The computer network segment according to claim 8, wherein a first apparatus of the at least two apparatuses is implemented in the first field device and a second apparatus of the at least two apparatuses is implemented in the second field device.

10. A method of protecting access to a segment in distributed systems,
the segment being designed as a networked client-server system with a smartphone as a client, the segment comprising at least two field devices as servers and interacting via a computer network or via an ad hoc network, each field device as server being equipped with access data, the access data comprising an individual access code and an individual code for locking a parameterization of the field device, and
the method comprising steps of:
acquiring, by an input device, the access data for a first field device, and
verifying, by a verification device, captured credentials from a second field device,
wherein the first field device and the second field device are coupled to the segment.

11. The method according to claim 10, wherein the access data is used to provide access to the first field device and/or the second field device.

12. The method according to claim 11, wherein the access data is used to temporarily enable access with the access data.

13. A nontransitory computer-readable storage medium comprising instructions stored therein, which, when executed by a computer, cause the computer to perform the steps of the method of claim 10.

\* \* \* \* \*